United States Patent
Mateer et al.

(10) Patent No.: US 9,635,179 B1
(45) Date of Patent: *Apr. 25, 2017

(54) CONSUMER CARE SYSTEM

(71) Applicant: West Corporation, Omaha, NE (US)

(72) Inventors: Michael T. Mateer, Omaha, NE (US); James K. Boutcher, Omaha, NE (US); Jesse Andersen, San Francisco, CA (US)

(73) Assignee: West Corporation, Omaha, NE (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/072,017

(22) Filed: Nov. 5, 2013

Related U.S. Application Data

(63) Continuation of application No. 13/269,881, filed on Oct. 10, 2011, now Pat. No. 8,600,417.

(51) Int. Cl.
| | | |
|---|---|---|
| *H04W 4/00* | (2009.01) | |
| *H04M 3/523* | (2006.01) | |
| *H04M 3/51* | (2006.01) | |
| *H04W 4/14* | (2009.01) | |

(52) U.S. Cl.
CPC ......... *H04M 3/523* (2013.01); *H04M 3/5191* (2013.01); *H04W 4/14* (2013.01)

(58) Field of Classification Search
CPC ......... H04W 4/12; H04W 8/245; H04W 4/14; H04W 72/005; H04L 29/08108; H04L 2012/5607; H04M 3/42042; H04M 3/56; H04M 1/65; H04M 1/58; H04M 3/51; H04M 3/523

USPC ... 455/412.1, 412.2, 412.3, 414.1, 415, 416, 455/418–420, 466; 370/310.2, 312; 379/70, 88.21, 142.04, 142.05, 142.07, 379/211.01, 211.02, 214.01, 215.01, 379/265.01–266.09

See application file for complete search history.

(56) References Cited

U.S. PATENT DOCUMENTS

| | | |
|---|---|---|
| 5,479,487 A | 12/1995 | Hammond |
| 6,408,066 B1 | 6/2002 | Andruska et al. |
| 6,493,695 B1 | 12/2002 | Pickering et al. |
| 6,751,306 B2 | 6/2004 | Himmel et al. |
| 6,771,760 B1 | 8/2004 | Vortman et al. |
| 7,106,850 B2 | 9/2006 | Campbell et al. |
| 7,913,063 B1 | 3/2011 | Lyerly |
| 7,953,663 B1 | 5/2011 | LeKachman |
| 2003/0091028 A1* | 5/2003 | Chang ............. H04M 7/0057 370/352 |
| 2006/0002540 A1 | 1/2006 | Kreiner et al. |
| 2006/0123060 A1* | 6/2006 | Allen et al. ............ 707/200 |
| 2007/0274495 A1 | 11/2007 | Youd et al. |

(Continued)

*Primary Examiner* — Steve D Agosta
(74) *Attorney, Agent, or Firm* — Raffi Gostanian

(57) ABSTRACT

An apparatus, a method, and a computer program are disclosed. According to one example the apparatus may be configured to receive via the receiver a message from a mobile device to connect with an agent. The apparatus may also be configured to determine and select an available agent via the processor in order for the mobile device to communicate with the available agent, and transmit via the transmitter an agent availability message to the mobile device, wherein the agent availability message requires an acknowledgement from the mobile device prior to connecting the mobile device with the available agent.

17 Claims, 7 Drawing Sheets

(56) References Cited

U.S. PATENT DOCUMENTS

2009/0285380 A1* 11/2009 Chen et al. .............. 379/210.01
2010/0027778 A1* 2/2010 Kumar et al. ........... 379/265.09

* cited by examiner

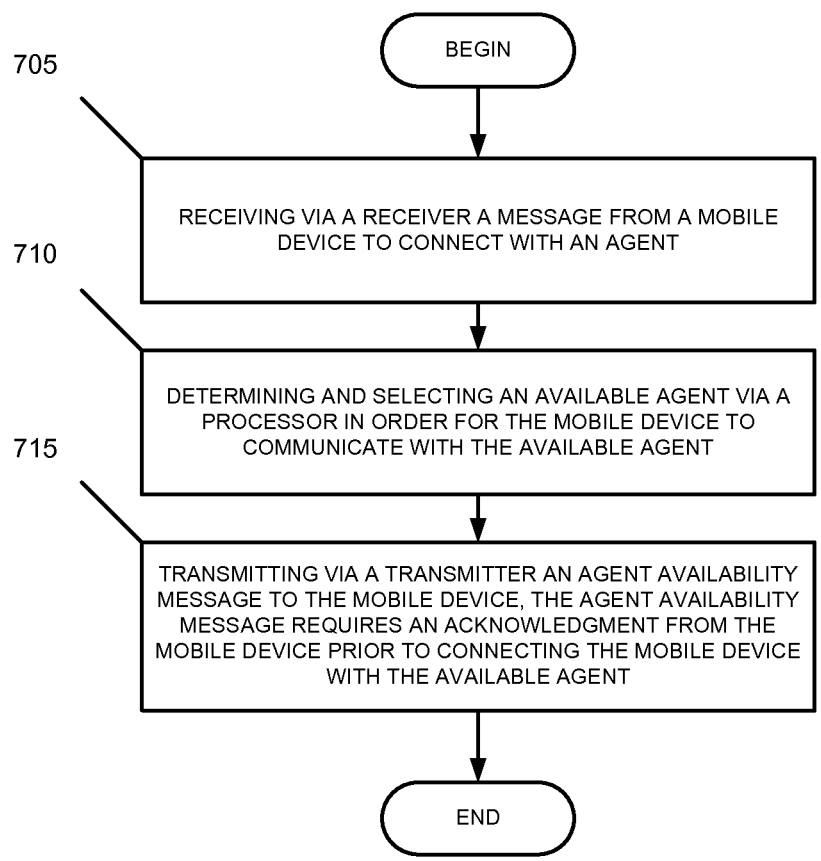

CONSUMER CARE SYSTEM

CROSS-REFERENCE TO RELATED APPLICATIONS

The present patent application is a continuation of and claims priority from patent application Ser. No. 13/269,881, entitled "CONSUMER CARE SYSTEM", filed Oct. 10, 2011, the entire contents of which are enclosed by reference herein.

FIELD

The present invention relates to a consumer care system and, more particularly, to a consumer care system that interfaces with a device to allow a consumer to connect with a contact center.

BACKGROUND

Various types of computing devices, such as mobile computing devices and computers, have become more and more pervasive in today's marketplace. As a result, various types of applications have been developed to assist users of such devices with various activities. As devices have increasingly become the way consumers (or customers) communicate, building applications to interface with the consumer of such devices may be beneficial.

SUMMARY

Certain embodiments of the present invention may provide solutions to the problems and needs in the art that have not yet been fully identified, appreciated, or solved by current customer service applications. For instance, one or more embodiments of the present invention describe a mobile or desktop care application that allows the consumer to quickly and efficiently communicate with one or more contact centers.

In accordance with an embodiment of the present invention, a method is provided. The method includes receiving via a receiver a message from a mobile device to connect with an agent, determining and selecting an available agent via a processor in order for the mobile device to communicate with the available agent, and transmitting via a transmitter an agent availability message to the mobile device, wherein the agent availability message requires an acknowledgement from the mobile device prior to connecting the mobile device with the available agent.

In yet another embodiment of the present invention, a computer program is provided. The computer program is embodied on a non-transitory computer readable medium and causes a processor to receive via a receiver a message from a mobile device to connect with an agent, determine and select an available agent via a processor in order for the mobile device to communicate with the available agent, and transmit via a transmitter an agent availability message to the mobile device, wherein the agent availability message requires an acknowledgement from the mobile device prior to connecting the mobile device with the available agent.

In yet another embodiment of the present invention, an apparatus is provided. The apparatus includes a receiver, a transmitter, a processor, and memory storing instructions. The instructions are configured to cause the processor to receive via the receiver a message from a mobile device to connect with an agent, determine and select an available agent via the processor in order for the mobile device to communicate with the available agent, and transmit via the transmitter an agent availability message to the mobile device, wherein the agent availability message requires an acknowledgement from the mobile device prior to connecting the mobile device with the available agent.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 7 illustrates an example method of operation, in accordance with another embodiment of the present invention.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Figure 1:
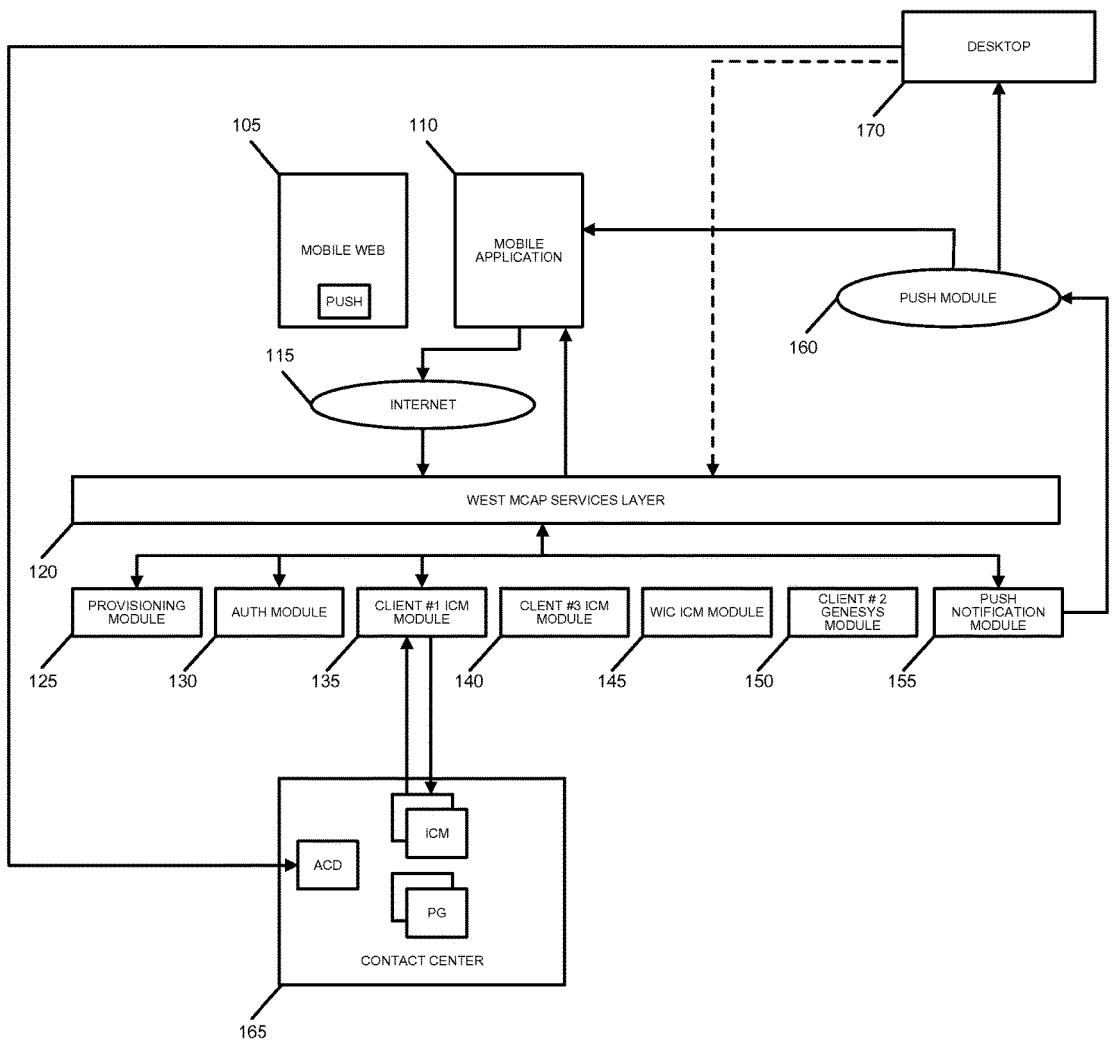
FIG. 1 illustrates a consumer care system, in accordance with an embodiment of the present invention.

FIG. 1 illustrates a consumer care system 100, in accordance with an embodiment of the present invention. The system 100 includes a mobile web 105, a mobile application (or native application) 110, the Internet 115, West MCAP services layer 120, a provisioning module 125, an authentication module 130, a Client #1 ICM module 135, a Client #3 ICM module 140, a WEST CORPORATION ICM module 145, an Client #2 Genesys module 150, a push notification module 155, a push module 160, and a Client #1 contact center 165, and/or a desktop 170. The desktop 170 may be a personal computer, a personal digital assistant, or any computing device that would be appreciated by a person of ordinary skill in the art.

In this embodiment, the mobile application 110 or desktop application is stored on a mobile device (not shown) or a desktop. A person of ordinary skill in the art will appreciate that the West MCAP services layer 120, the provisioning module 125, the authentication module 130, the Client #1 ICM module 135, the Client #3 ICM module 140, the WEST CORPORATION ICM module 145, the Client #2 Genesys module 150, the push notification module 155, and the push module 160 can be stored on one or more servers (not shown). The Client #1 contact center 165 can be implemented on a remote server (not shown). However, what hardware devices are used to store the various software applications, and where they are stored, is a matter of design choice.

The mobile application 110 is configured to send or transmit a request message to a web server (not shown) via the Internet 115. In another embodiment, the desktop is configured to transmit the request message using a desktop application, such as an instant messaging or email feature, to a server implemented at the WEST MCAP services layer 120. For the sake of simplicity, the description will be based on the mobile application 110, but it should be appreciated that the embodiments may be carried out by a desktop application.

The web server can be implemented on the WEST MCAP services layer 120. The request message is a request to connect an agent with the user of the mobile application 110. The request message may include, among other things, a client identification, an application authentication key, and a callback number. Using the information in the request message, the web server is configured to authenticate the mobile application (or user) 110 via the authentication module 130 and return a session token to the mobile application 110. Upon authentication, the web server is further configured to utilize the provisioning module 125 to provision a database (not shown) for enabled services and service location based on the information included in the request message. It should be appreciated that the web server can provision for client identification, an application authentication key, enabled services, service location, and security level information, as well as any other desired information or data.

Based on the provisioning, the web server then forwards the request message to the appropriate server or service provider. The request message is forwarded to the appropriate server based on the agent's state, skills, etc. For instance, if the request message includes information that matches one or more agents' skills at Client #1 module 135, then the request message can be sent to the appropriate Client #1 IVR-PG servers or the Client #1 ICM module 135. If the Client #1 ICM module 135 does not have agents available, the call of the mobile application is placed or stored in a queue and a progress message is sent to the web server. The web server forwards or transmits the progress message to the mobile application 110.

If the agent is currently available, or once the agent becomes available, the Client #1 ICM module 135 can generate or determine the dial-in number for the available agent. Client #1 ICM module 135 then sends an agent-selected message to the web server. The agent selected message can include the client identification, application authorization, and other optional data such as target contact center information and/or dial-in number (e.g., 1-8YY Number). The web server issues a push notification request message, and sends the push notification request message with the target contact center information to the push notification module (or push notification services) 155. The push notification module 155 forwards the push notification request message to the push module (e.g., mobile or desktop push services module) 160, which forwards the push notification request message to the mobile application 110 or the desktop application with a message such as "the agent is ready to take your call at 1-8YY-YYYY."

It should be appreciated that in order to push notifications to the desktop 170, the desktop 170 has a session initiation protocol (SIP) client. Thus, when a push notification is triggered from the unified contact platform (UCP) with the 1-8YY number for the target contact center, the SIP client would be invoked.

The user of the mobile application 110 selects the view and/or call button to open the mobile application 110 and the event is sent to the web server. The mobile application 110 dials the 1-8YY number to begin the call and the call is connected to the target call center in order for the target call center to assist the user of the mobile application 110. In this case, the target call center can be the Client #1 contact center 165. When the call has ended with the ACD of the Client #1 contact center 165, the call is terminated.

Figure 2:
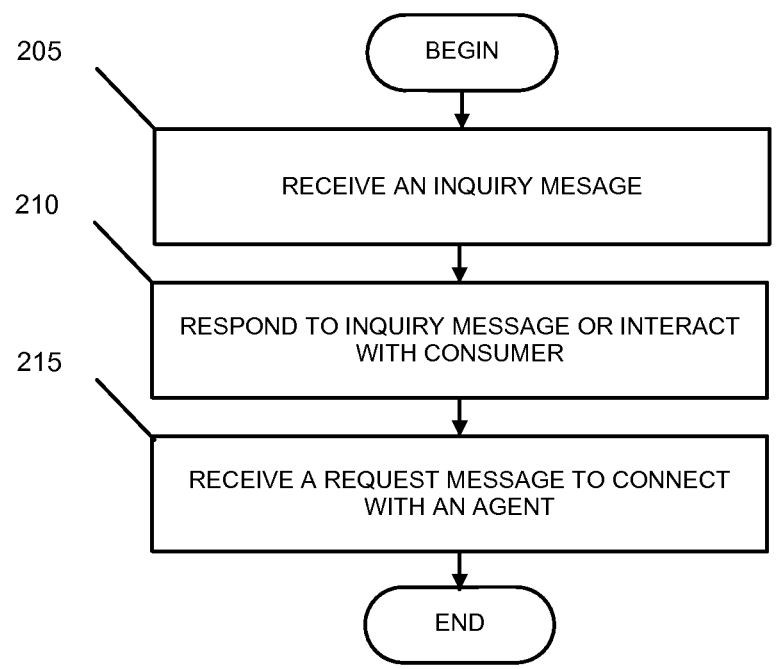
FIG. 2 illustrates a method for transmitting contact information of an available agent, in accordance with an embodiment of the present invention.

FIG. 2 illustrates a method 200 for transmitting contact information of an available agent, in accordance with an embodiment of the present invention. It should be appreciated that an application stored on a server, for example, may be configured to cause a processor to execute method 200. At 205, a server receives an inquiry message from a consumer operating a mobile device, a desktop device, or any device that would be appreciated by a person of ordinary skill in the art. The message may be in short message service (SMS) format, an instant message format, or any format that would be appreciated by a person of ordinary skill in the art. At 210, the server responds to the inquiry (or interacts with the consumer) in an automated format until the server receives a request to speak with an agent. At 215, the server transmits the contact information of an available agent to the consumer of the mobile device or desktop via SMS or other means.

Figure 3:
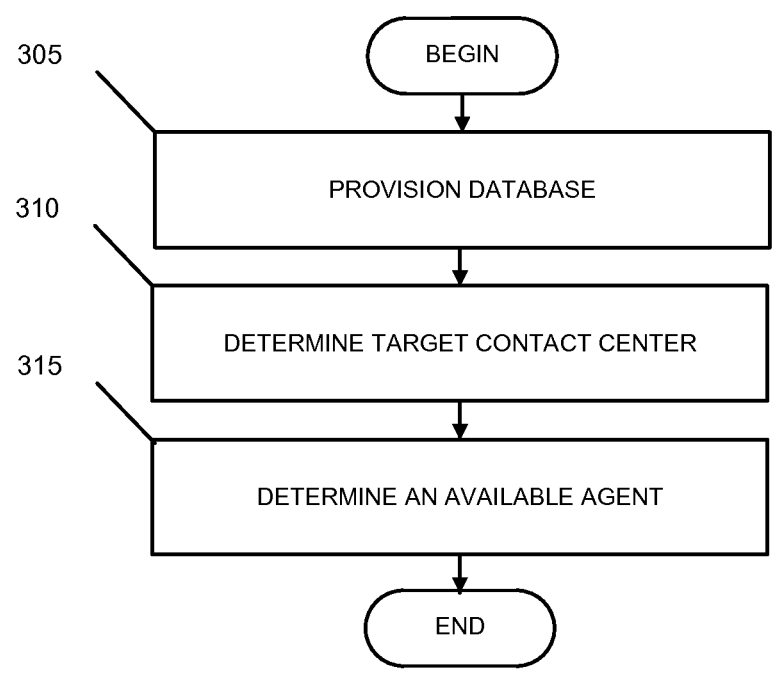
FIG. 3 illustrates a method for determining the available agent, in accordance with an embodiment of the present invention.

FIG. 3 illustrates a method 300 for determining the available agent, in accordance with an embodiment of the present invention. It should be appreciated that an application stored on a server, for example, may be configured to cause a processor to execute method 300. At 305, based on the information collected during the interaction with the consumer, the server provisions a database and determines at 310 the appropriate target contact center or service provider. The server may also utilize information located in the inquiry message and the request message to determine the target contact center. In some embodiments, the server may use a platform such as an Intelligent Routing Platform to select the target contact center as well as determine which agent is available at a particular contact center. For instance, the server may leverage Intelligent Routing Technologies (e.g., Cisco ICM, Genesys URS, and/or Avaya) and make the technologies available to all self-service channels, such as Voice, Web/Mobile Web, SMS, Native Mobile Application, and Interactive Television. In particular, when the server issues a request on what to do with a call from a consumer or client, the Intelligent Routing Platform is used to connect to one or more call centers to determine the contact center and agent that are capable of handling the consumer's inquiry based on the agent state, skills, etc.

At 315, upon determining the target contact center, the server determines and selects, using the Intelligent Routing Technologies, an available agent based on the information provided in the inquiry message, the interaction, and/or the request message. In an alternative embodiment, an agent, who becomes available, may transmit an availability message to the server using the Intelligent Routing Technologies.

Figure 4:
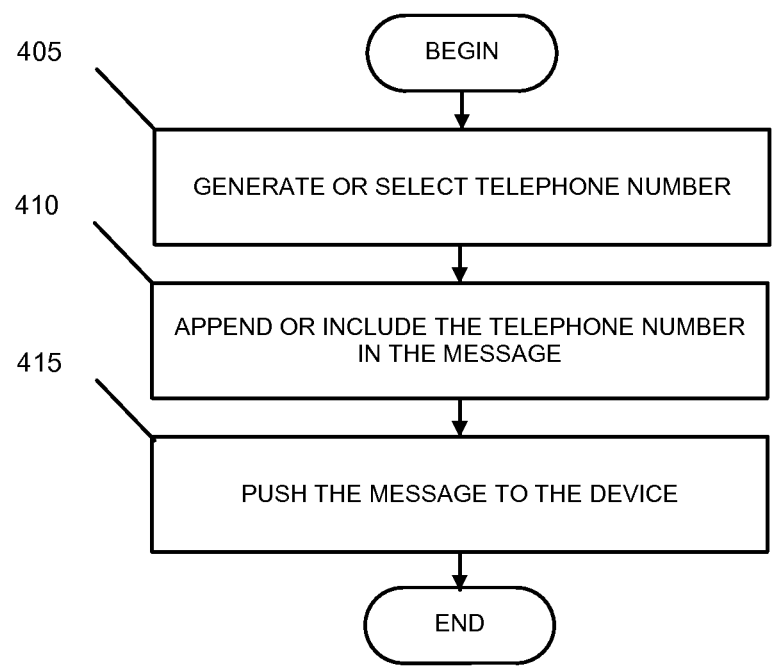
FIG. 4 illustrates a method for transmitting the contact information of the available agent, in accordance with an embodiment of the present invention.

FIG. 4 illustrates a method 400 for transmitting the contact information of the available agent, in accordance with an embodiment of the present invention. It should be appreciated that an application stored on a server, for example, may be configured to cause a processor to execute method 400.

Upon selecting the available agent for the consumer to speak with, the server generates or selects at 405 a telephone number (e.g. 1-8YY-YYYY) of the available agent at the target contact center. The telephone number is appended to (or included within) an agent availability message at 410. At 415, the agent availability message is pushed or transmitted via SMS to the mobile device or the desktop. The message is pushed utilizing the push notification module 155 and the push module 160.

The methods described herein allow the consumer to receive the contact information of the agent on his or her mobile device or desktop and connect to the agent by selecting the link in the message or by dialing the telephone number of the agent using a public switch telephone network (PSTN).

The method steps shown in FIGS. 2-4 may be performed, in part, by a computer program, encoding instructions for a nonlinear adaptive processor to cause at least the methods described in FIGS. 2-4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2-4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 5:
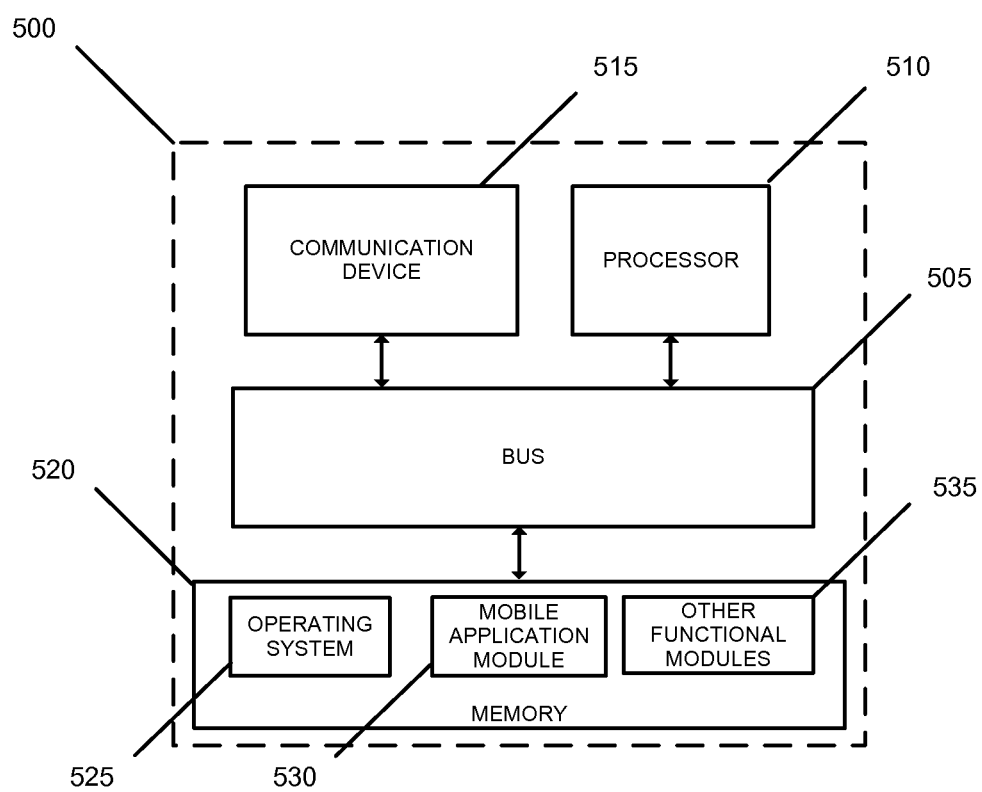
FIG. 5 illustrates a block diagram of a consumer care system, in accordance with an embodiment of the present invention.

FIG. 5 illustrates a block diagram of a consumer care system 500, in accordance with one or more embodiments of the present invention. The system may be a desktop computer, server, distributed series of servers, a cloud computing system, or any other device or collection of devices, as would be appreciated by a person of ordinary skill in the art. System 500 may include a bus 505 or other communication mechanism that can communicate information and a processor 510, coupled to bus 505, that can process information. Processor 510 can be any type of general or specific purpose processor. System 500 may also include a memory 520 that can store information and instructions to be executed by processor 510. Memory 520 can be comprised of any combination of random access memory ("RAM"), read only memory ("ROM"), static storage such as a magnetic or optical disk, or any other type of computer readable medium. System 500 may also include a communication device 515, such as a network interface card, that may provide access to a network.

The computer readable medium may be any available media that can be accessed by processor 510. The computer readable medium may include both volatile and nonvolatile medium, removable and non-removable media, and communication media. The communication media may include computer readable instructions, data structures, program modules, or other data and may include any information delivery media.

According to one embodiment, memory 520 may store software modules that may provide functionality when executed by processor 510. The modules can include an operating system 525 and a mobile application module 530, as well as other functional modules 535. Operating system 525 may provide operating system functionality for system 500. Because system 500 may be part of a larger system, system 500 may include one or more additional functional modules 535 to include the additional functionally. For example, other functional modules 535 may include desktop application modules as described above.

Figure 6:
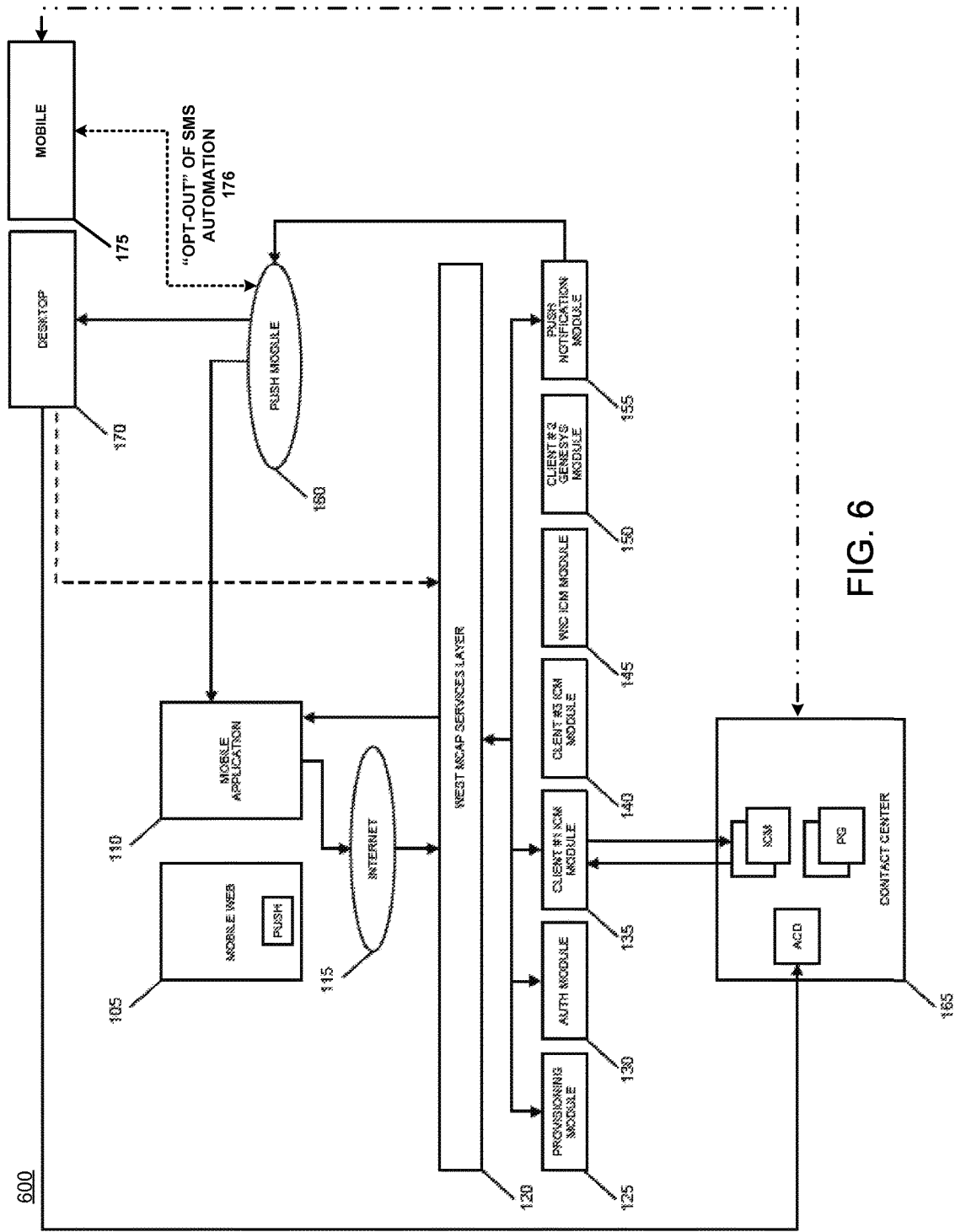
FIG. 6 illustrates another consumer care system, in accordance with another embodiment of the present invention.

FIG. 6 illustrates a consumer care system 600, in accordance with another embodiment of the present invention. The system 600 includes a mobile web 105, a mobile application (or native application) 110, the Internet 115, West MCAP services layer 120, a provisioning module 125, an authentication module 130, a Client #1 ICM module 135, a Client #3 ICM module 140, a WEST CORPORATION ICM module 145, an Client #2 Genesys module 150, a push notification module 155, a push module 160, and a Client #1 contact center 165, and/or a desktop 170. The desktop 170 may be a personal computer, a personal digital assistant, or any computing device that would be appreciated by a person of ordinary skill in the art. The system 600 also includes a mobile device 175 that may be used to receive calls, SMS messages and similar data communications. FIG. 6 includes similar components to those illustrated in FIG. 1, like components include like functionality and related features.

The mobile application 110 is configured to send or transmit a request message to a web server (not shown) via the Internet 115. In another embodiment, the desktop is configured to transmit the request message using a desktop application, such as an instant messaging or email feature, to a server implemented at the WEST MCAP services layer 120. For the sake of simplicity, the description will be based on the mobile application 110, but it should be appreciated that the embodiments may be carried out by a desktop application.

In another example, the mobile device 175 may perform an initial communication to a receiving device, such as one or more devices located at the contact center 165. The initial communication may be performed via a voice call and/or a SMS message that is initiated by the user of the mobile device 175 to establish a call for customer service at the contact center 165. Once the mobile device 175 has been setup on a live call and/or a live session that is active in the contact center 165, the user may "opt-out" 176 of SMS automation to be transferred to a live agent or voice agent directly.

The "opt-out" may be performed by transmitting a SMS message to the contact center 165 and/or selecting an "opt-out" feature or button offered to the user under varying circumstances. Once the user has opted-out of the SMS automated menu options, the call may be automatically forwarded to a live or virtual agent ready to provide voice instructions and/or voice commands to assist the mobile device user. The forwarded call may be answered by an automated agent queue service that informs the user that all agents are currently busy and that the user would have to be placed on hold until an agent becomes available. The user's call may then be placed in a wait queue with other users' calls. After an agent becomes available and the user is next in the queue order to receive assistance, a SMS message may then be transmitted to the user's mobile device 175 via the push module 160. The user may have a predetermined amount of time (e.g., 15 seconds, 30 seconds, 1 minute, etc.) to accept the SMS message by selecting a feedback button (e.g., "Yes, please connect me with a live agent") provided in the SMS message.

In another example, the user may be informed prior to being placed in the wait queue that the call will be temporarily disconnected until an agent is available. In this example, the user may wait until they are next in the queue order and an agent becomes available by a look-ahead operation performed by the contact center 165 to determine agent availability. The look-ahead operation may include determining whether an agent is available and the user's current wait queue position. Next, the user's wait time may be calculated and sent to the user via a SMS message to inform the user of his or her upcoming session with the agent. When the agent becomes available, the contact center 165 may initiate a SMS message or email to the mobile device 175 informing the user of the availability. The SMS message may include a telephone number (e.g. 1-8YY-YYYY) of the available agent at the target contact center 165.

FIG. 7 illustrates a method 700 for transmitting the contact information of the available agent when a user has opted-out of SMS messaging and has requested a live agent, in accordance with an embodiment of the present invention. It should be appreciated that an application stored on a server, for example, may be configured to cause a processor to execute method 700.

Upon the user transmitting the request message and the server receiving the request message to "opt-out" of the SMS automation at 705, the server may perform placing the user's request and/or live call in a call wait queue until a server becomes available. When the server becomes available, the server may perform selecting the available agent for the consumer to speak with based on agent availability and the agent's known capabilities to handle the call at 710. The server may then perform generating or selecting at a telephone number (e.g. 1-8YY-YYYY) of the available agent at the target contact center. The telephone number is appended to (or included within) an agent availability message. At 715, the agent availability message is pushed and/or transmitted via SMS to the mobile device 175 or the desktop 170. The message is pushed by utilizing the push notification module 155 and the push module 160. The server may then receive a call dialed by the user via a selecting or clicking operation performed by the user to contact the agent at the telephone number provided to the user at 730. The server may require some form of confirmation, acknowledgement, or action on the part of the user of the mobile device prior to connecting the mobile device with the available agent.

The methods described herein allow the consumer to receive the contact information of the agent on his or her mobile device or desktop and connect to the agent by selecting the link in the message or by dialing the telephone number of the agent using a public switch telephone network (PSTN).

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
    receiving via a receiver a request from a mobile device to opt-out of receiving automated messages and speak with an available agent, wherein the request comprises a client identification, an application authentication key and a callback number of the mobile device;
    authenticating the mobile device and returning a session token to a mobile application operating on the mobile device;
    storing at least one of the request and a live call associated with the request in a call wait queue;
    calculating an estimated wait time until the available agent is available and transmitting the estimated wait time to the mobile device;
    appending a number associated with the available agent and an agent communication device to an agent availability message when the available agent becomes available;
    transmitting the agent availability message to the mobile device; and
    connecting the mobile device with the agent device when the mobile device transmits an acceptance message to the agent availability message within a predetermined amount of time.

2. The method of claim 1, wherein the request comprises at least one of a short message service (SMS) and an email transmitted from the mobile device, and further comprises a caller email address.

3. The method of claim 1, comprising determining and selecting an available agent via a processor in order for the mobile device to communicate with the available agent.

4. The method of claim 3, wherein the determining of the available agent further comprises at least one of identifying the available agent from a plurality of agents, and waiting until one of the plurality of agents becomes available in order to determine the available agent.

5. The method of claim 1, wherein the agent availability message comprises a push notification request message in order for the mobile device to connect with the available agent.

6. The method of claim 1, wherein the transmitting of the agent availability message further comprises transmitting the agent availability message to the device via a push notification module.

7. A computer program embodied on a non-transitory computer-readable storage medium, the computer program, when executed, causes a processor to perform:
    receiving via a receiver a request from a mobile device to opt-out of receiving automated messages and speak with an available agent, wherein the request comprises a client identification, an application authentication key and a callback number of the mobile device;
    authenticating the mobile device and returning a session token to a mobile application operating on the mobile device;
    storing at least one of the request and a live call associated with the request in a call wait queue;

calculating an estimated wait time until the available agent is available and transmitting the estimated wait time to the mobile device;

appending a number associated with the available agent and an agent communication device to an agent availability message when the available agent becomes available;

transmitting the agent availability message to the mobile device; and connecting the mobile device with the agent device when the mobile device transmits an acceptance message to the agent availability message within a predetermined amount of time.

8. The computer program of claim 7, wherein the request comprises at least one of a short message service (SMS) and an email transmitted from the mobile device, and further comprises a caller email address.

9. The computer program of claim 7, when executed, causes the processor to perform determining and selecting an available agent via a processor in order for the mobile device to communicate with the available agent.

10. The computer program of claim 9, wherein the determining of the available agent further comprises at least one of identifying the available agent from a plurality of agents, and waiting until one of the plurality of agents becomes available in order to determine the available agent.

11. The computer program of claim 7, wherein the agent availability message comprises a push notification request message in order for the mobile device to connect with the available agent.

12. The computer program of claim 7, wherein the transmitting of the agent availability message further comprises transmitting the agent availability message to the device via a push notification module.

13. An apparatus, comprising:
a receiver;
a transmitter;
a processor; and
memory;
wherein the receiver, the transmitter and the memory are communicably coupled to the processor;
wherein the processor:

receives via the receiver a request from a mobile device to opt-out of receiving automated messages and speak with an available agent, wherein the request comprises a client identification, an application authentication key and a callback number of the mobile device;

authenticates the mobile device and returning a session token to a mobile application operating on the mobile device;

stores at least one of the request and a live call associated with the request in a call wait queue;

calculates an estimated wait time until the available agent is available and transmitting the estimated wait time to the mobile device;

appends a number associated with the available agent and an agent communication device to an agent availability message when the available agent becomes available; and wherein the transmitter transmits the agent availability message to the mobile device, and connects the mobile device with the agent device when the mobile device transmits an acceptance message to the agent availability message within a predetermined amount of time.

14. The apparatus of claim 13, wherein the request comprises at least one of a short message service (SMS) and an email transmitted from the mobile device, and further comprises a caller email address.

15. The apparatus of claim 13, wherein the processor determines and selects an available agent via a processor in order for the mobile device to communicate with the available agent.

16. The apparatus of claim 15, wherein the determination of the available agent further comprises at least one of identifies the available agent from a plurality of agents, and waiting until one of the plurality of agents becomes available in order to determine the available agent.

17. The apparatus of claim 13, wherein the agent availability message comprises a push notification request message in order for the mobile device to connect with the available agent.

* * * * *